UNITED STATES PATENT OFFICE.

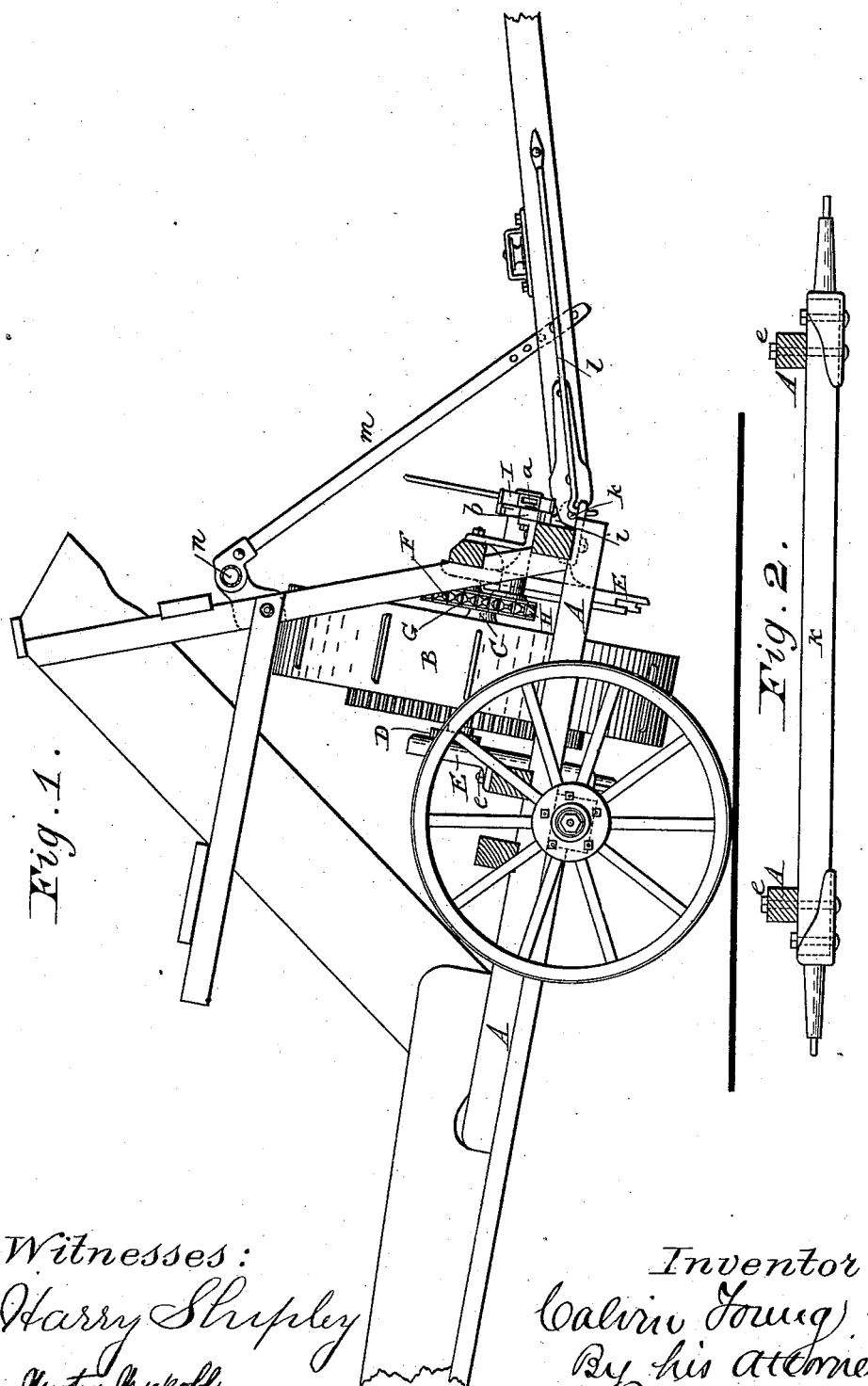

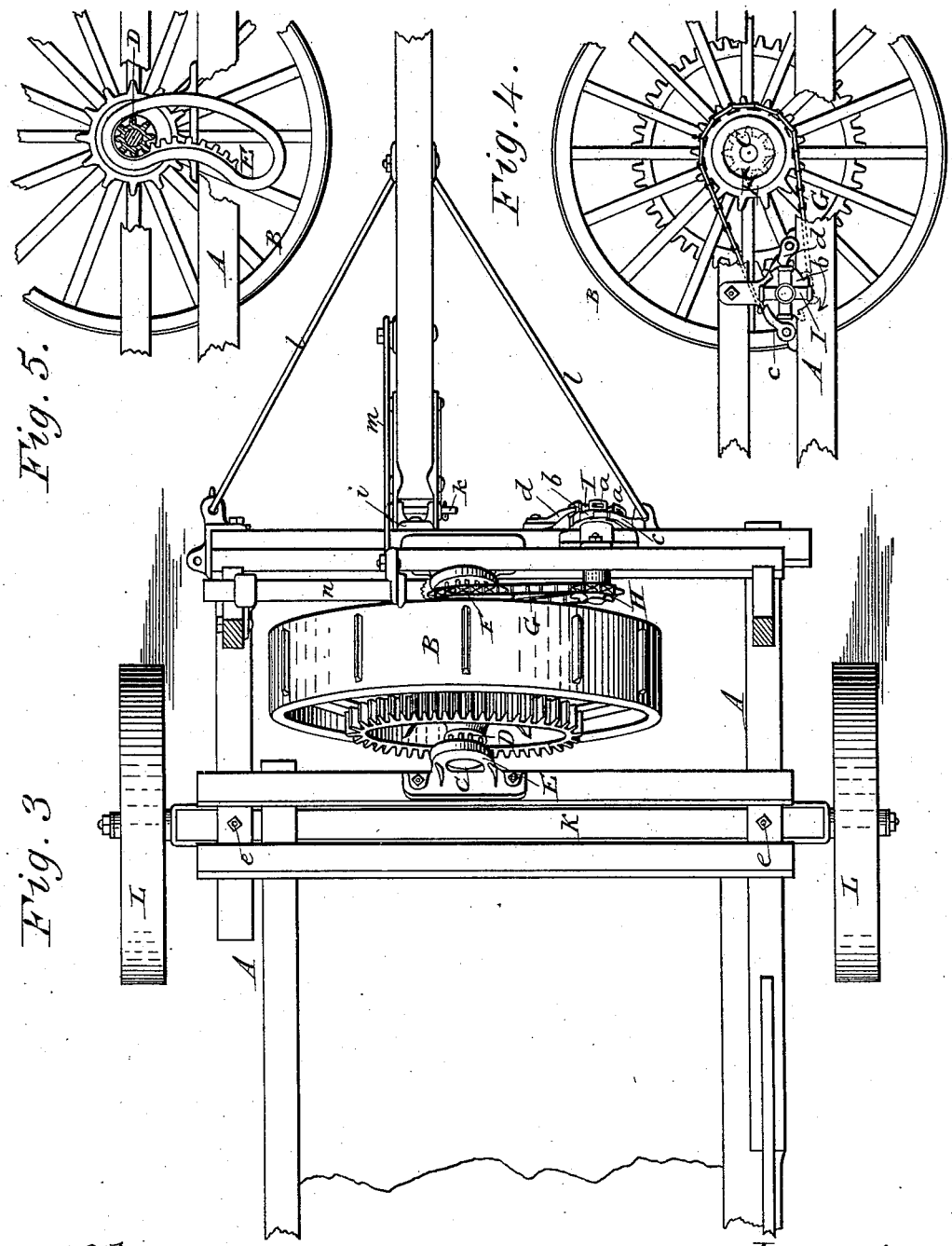

CALVIN YOUNG, OF AUBURN, NEW YORK, ASSIGNOR OF ONE-HALF TO D. M. OSBORNE & CO., OF NEW YORK.

HARVESTING-MACHINE.

SPECIFICATION forming part of Letters Patent No. 294,837, dated March 11, 1884.

Application filed July 7, 1883. (No model.)

*To all whom it may concern:*

Be it known that I, CALVIN YOUNG, of Auburn, in the county of Cayuga and State of New York, have invented certain Improvements in Harvesting-Machines, of which the following is a specification.

This invention relates to the mounting of harvesting or harvesting and binding machines temporarily upon truck-wheels standing at right angles to the main or road wheel, in order that the machines may be conveniently transported from place to place and carried endwise through gates and other narrow passages. It has special reference to those machines which are provided with means for raising and lowering the main frame with respect to the wheel; and the aim of the invention is to render the frame-adjusting mechanism available for the purpose of placing the machine on the truck-wheels, in order to avoid the necessity for the special appliances and for the troublesome changes in the connection of the parts, as hitherto required.

With this end in view the invention consists, essentially, in combining with the main frame and removable truck-wheels adjusting mechanism connecting the frame and main wheel, and adapted, without change, reversal, or disconnection of its parts, to elevate the frame with respect to the wheel, or elevate and suspend the wheel within the frame, this adjusting mechanism being provided with locking devices whereby it may be secured against movement in either direction at will. The above combination permits the frame to be lifted with respect to the main wheel, while the latter rests upon the ground, in order to permit the application of the truck-wheels, after which the same mechanism serves to elevate the main wheel within the frame and secure the same in its elevated position.

I am aware that it is old to apply removable truck-wheels to harvesters and other machines at right angles to the main wheel, and also that it has been proposed to employ a frame-adjusting mechanism which could be disconnected and reversed to lift the main wheel and hold the same in suspension. My construction avoids the excessive trouble and delay required to effect the disconnection and reversal of the adjusting devices which are necessarily locked within the frame in such position as to be exceedingly difficult of access.

In the accompanying drawings I have represented the machine as provided with my improved adjusting mechanism; but it is to be distinctly understood that any equivalent mechanism may be employed in carrying out the method which forms the main subject of the invention.

Referring to the drawings, Figure 1 represents a side elevation of a harvesting-machine mounted upon a truck. Fig. 2 is an elevation of the axle and part of the truck, showing also the frame-bars and the devices by which they are connected to said axle. Fig. 3 is a plan view of the parts represented in Fig. 1. Fig. 4 is a side elevation, illustrating in detail the mechanism by which the vertical adjustment of the frame and wheel is effected, the rack-plates being omitted. Fig. 5 is a similar elevation, illustrating the rack-plates and pinions.

Referring to the drawings, A represents the main frame of a harvester, which, in the present instance, is provided with the usual elevator-frame, and adapted to receive an automatic binding-machine, which is, however, omitted.

B represents the usual main or road wheel by which the main frame is carried and motion imparted to the operative parts of the machine. This wheel is mounted, as usual, upon a horizontal axle, C, the ends of which are fixed within pinions D, arranged to travel in upright slotted rack-plates E, bolted firmly to the main frame, so that by the rotation of the axle the pinions will be caused to travel up and down the rack-plates, the rotation in one direction, when the wheel rests upon the ground, serving to elevate the main frame with respect to the wheel, and the rotation in the opposite direction, when the frame is otherwise supported, serving to lift the wheel with respect to the frame. For the purpose of imparting a positive rotation to the axle in both directions, and of locking the same at the required point, it is provided at one end with a sprocket-wheel, F, from which an endless chain, G, extends backward around a second sprocket-wheel, H. The second wheel, H, which is preferably of smaller size than the other, is mounted on one end of a short horizontal shaft sustained in suitable bearings on the main frame, and provided at the outer end with a wheel, I, which is constructed with holes or sockets $a$, to receive an operating-lever, and also with a series of ratchet-teeth, $h$, to engage with a locking dog or pawl, $c$, which is pivoted to the main frame. By inserting the bar or lever in the sockets of the wheel I and turning the latter in the direction indicated by the arrow in Fig. 4, motion is transmitted through the chain and sprocket-wheels to the axle, which is revolved in such direction that the pinions upon its ends elevate the main frame, which is automatically locked in its elevated position by the engagement of the pawl $c$ with the ratchet-wheel. If, instead of revolving the wheel I in the direction above described, the pawl C be disengaged and the wheel revolved in the opposite direction, the effect will be to revolve the axle and pinions in such manner as to lower the main frame with respect to the road-wheel, or, if the frame be supported, to elevate the wheel with respect to the frame. For the purpose of automatically locking the parts when thus operated, and of maintaining the wheel in an elevated position after being raised, a second dog, $d$, is pivoted to the main frame and arranged to engage in sockets or recesses in the wheel I. It is preferred to employ two independent dogs, for the reason that either will act automatically upon the other being thrown out of action. If preferred, however, a single dog arranged to engage in square notches or teeth in the wheel may be employed to lock the same against rotation in either direction. When thus constructed, however, the dog will not be automatic in its action, but will require to be thrown into and out of its locked position by hand.

In providing for the carriage of the machine, constructed as above, upon temporary wheels, I provide, as shown in Figs. 1, 2, and 3, an axle, K, of sufficient length to extend transversely across the main frame from side to side, and upon each end of said axle place a ground-wheel, L. In proceeding to mount the machine, the dog $d$ is thrown out of action and the dog $c$ placed in an operative position. The wheel I is then revolved until the main frame, sustained by the main wheel resting upon the ground, is elevated a sufficient distance to permit the axle K to be placed thereunder with the wheels upon its ends, as represented in Fig. 3. The axle having been thus placed, and having been secured to the main frame by means of vertical bolts $e$ or other temporary fastening devices, the dog $c$ is thrown out of action, the dog $d$ placed in an operative position, and the motion of the wheel I reversed, the effect of which is to throw the weight of the machine wholly upon the axle K and its wheels, and to lift the main or road wheel B upward within the main frame, so as to be carried thereby above and clear of the ground, as plainly represented in Fig. 1. The machine being thus mounted, I next attach the usual draft pole or tongue employed at the front, at the inner end of the frame, at right angles to its original position, connecting it with the plate $i$ on the frame by means of a transverse pin, $k$, and also connecting it to the frame by means of the lateral braces $l$ and the upright brace $m$. The plates or castings to receive the end of the tongue and the ends of the lateral braces are made of the form shown, or other suitable form, and bolted to the frame, as represented. The lateral braces are those commonly employed in connection with the tongue when in its usual position. The upright brace $m$ is mounted at its upper end on the transverse rod or tube $n$, which is secured to the harvester-frame, as usual, for the purpose of giving support to an automatic binding mechanism. The lower end of the brace $m$ may be provided with a series of perforations, to admit of the draft-pole being adjusted vertically. The machine mounted, as above, upon the transverse axle will be found practically balanced thereon, while the tongue, having a rigid connection with the frame, admits of the machine moving from place to place with ease and safety.

The present invention is restricted to those matters and things which are hereinafter claimed, and as to all matters which may be described or shown, but which are not claimed, the right is reserved to make the same the subject of a separate application.

Having thus described my invention, what I claim is—

1. In combination with removable truck-wheels, a harvester-frame, a main wheel therefor, an intermediate mechanism, substantially as described, forming a permanent connection between the wheel and frame, and acting to raise either in respect to the other, and locking devices whereby said mechanism may be caused to sustain the frame upon the wheel, or to suspend the wheel within the frame, at will.

2. In combination with the main frame and rack-plates, the main wheel, the axle provided with the pinions and chain-wheel, the endless chain, the actuating-wheel therefor, and the two alternately-acting automatic pawls, adapted to lock said actuating-wheel against rotation in opposite directions.

3. In combination with removable truck-wheels, substantially as described, the harvester-frame, the main wheel, the main axle, the rack-plates and pinions connecting the axle with the frame, the endless chain and chain-wheels to actuate and hold the axle, and means, substantially as described, for locking the chain against motion in each direction.

4. In combination with removable truck-wheels, the harvester-frame provided with rack-plates to receive the axle, the main wheel, the axle provided with the pinions and chain-wheel, the endless chain, the chain-wheel on the frame, and the two alternately-acting pawls, whereby the parts may be locked against motion in opposite directions alternately.

CALVIN YOUNG.

Witnesses:
ALLEN McLAIN,
W. L. JAY.